Figure 1:
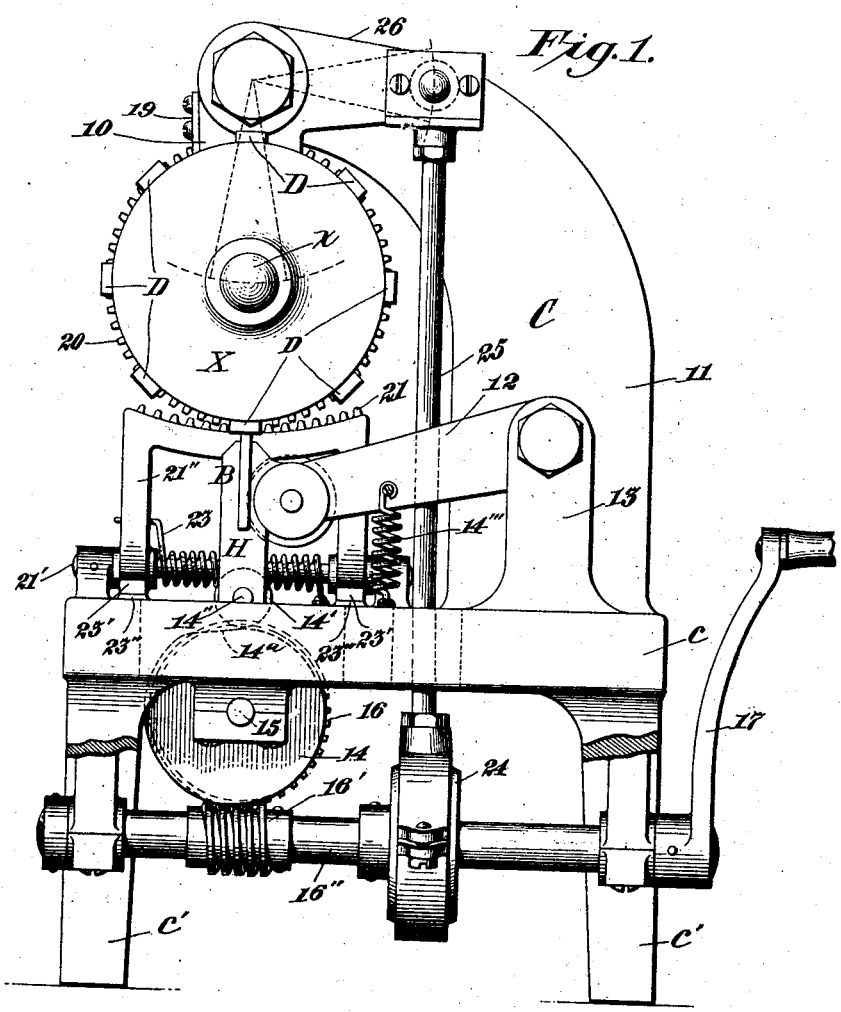

F. H. RICHARDS.
DIE AND DIE MECHANISM.
APPLICATION FILED APR. 16, 1901. RENEWED AUG. 13, 1908.

919,228.

Patented Apr. 20, 1909.
6 SHEETS—SHEET 1.

Witnesses

Inventor

F. H. RICHARDS.
DIE AND DIE MECHANISM.
APPLICATION FILED APR. 16, 1901. RENEWED AUG. 13, 1908.
919,228.
Patented Apr. 20, 1909.
6 SHEETS—SHEET 2.
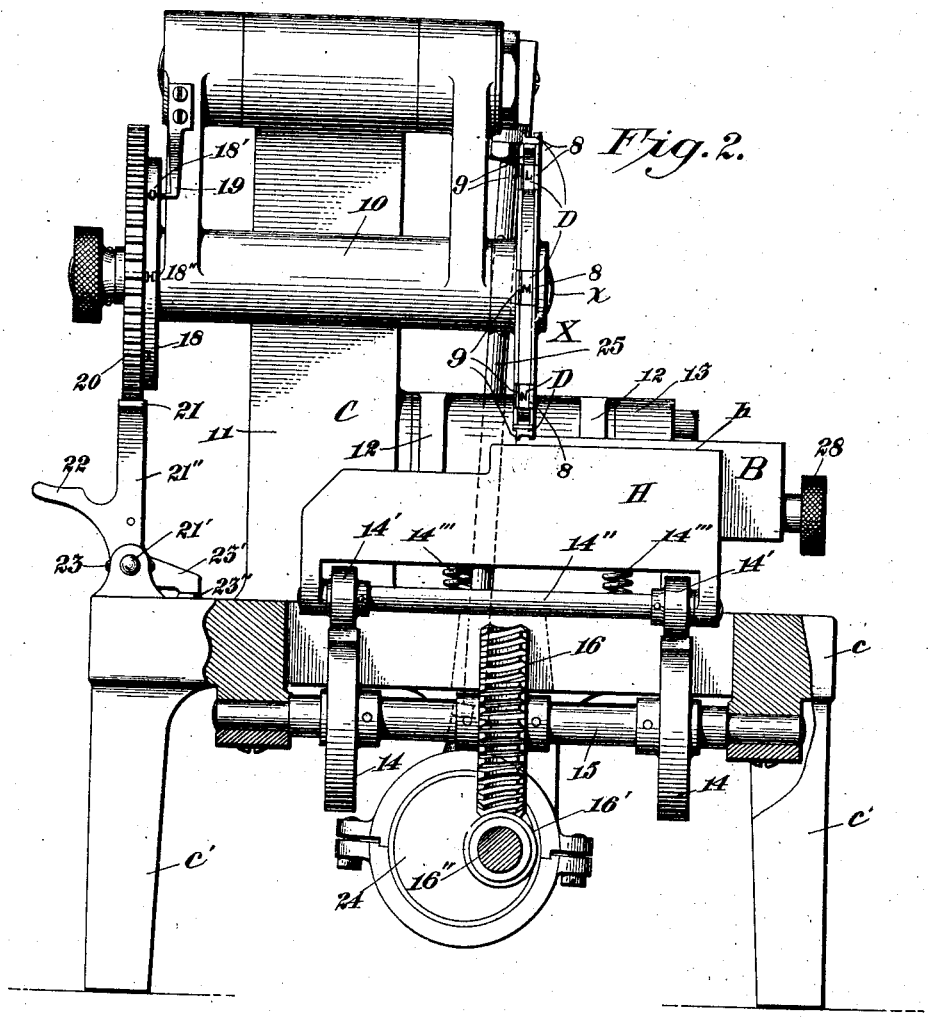
Witnesses
Inventor:

F. H. RICHARDS.
DIE AND DIE MECHANISM.
APPLICATION FILED APR. 16, 1901. RENEWED AUG. 13, 1908.
919,228.
Patented Apr. 20, 1909.
6 SHEETS—SHEET 3.
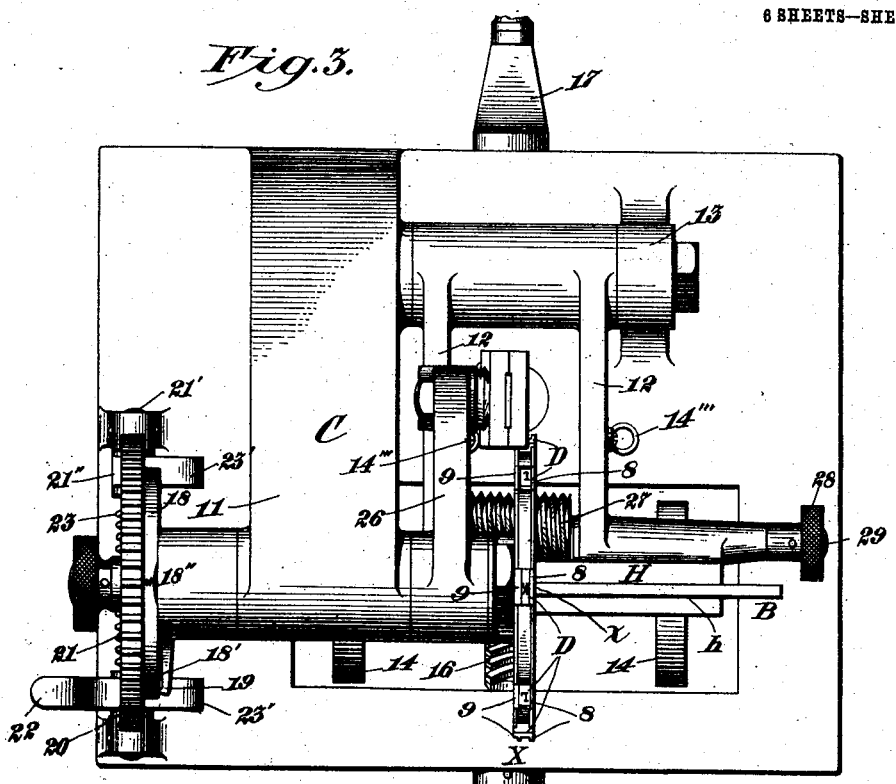
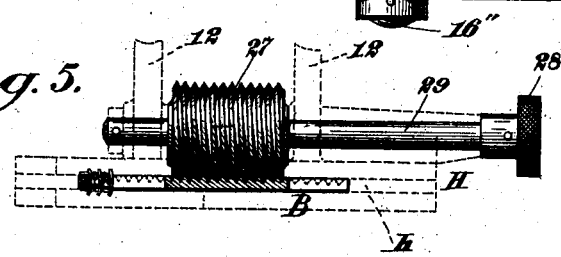
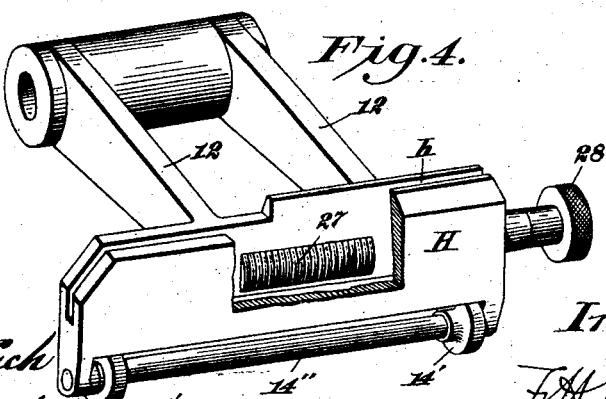
Witnesses
Inventor
F. H. Richards F. H. RICHARDS.
DIE AND DIE MECHANISM.
APPLICATION FILED APR. 16, 1901. RENEWED AUG. 13, 1908.
919,228.
Patented Apr. 20, 1909.
6 SHEETS—SHEET 4.
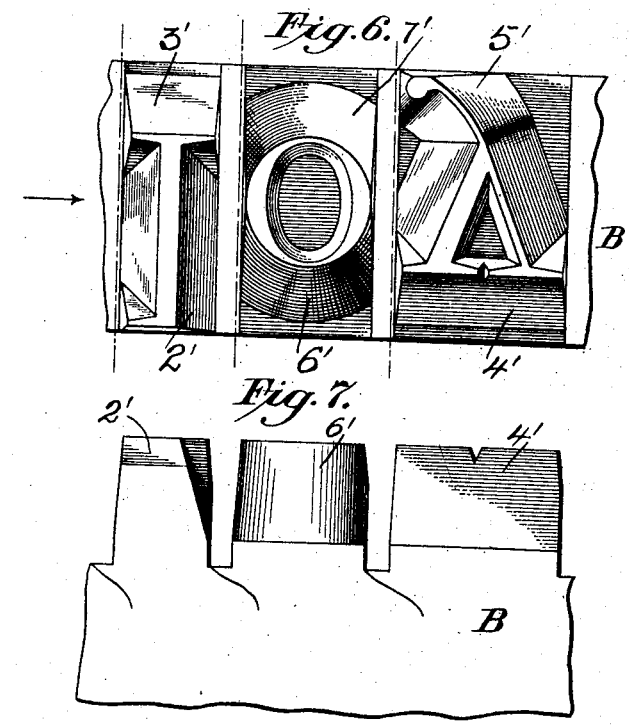
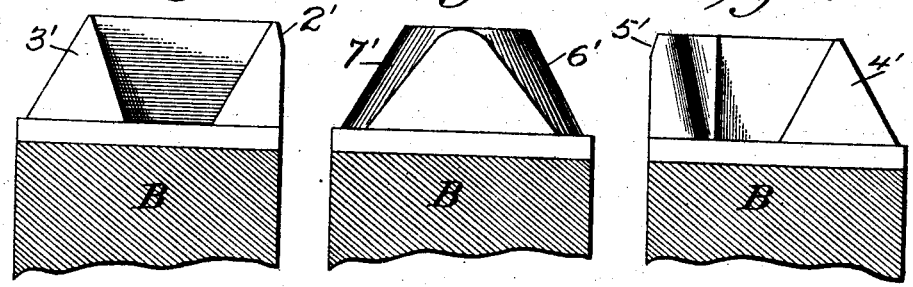
Witnesses
H. S. Dieterich
F. N. Nanland
Inventor
F. H. Richards.

F. H. RICHARDS.
DIE AND DIE MECHANISM.
APPLICATION FILED APR. 16, 1901, RENEWED AUG. 13, 1908.

919,228.

Patented Apr. 20, 1909.
6 SHEETS—SHEET 5.

Witnesses
H. G. Dieterich
F. H. Noiland

Inventor
F. H. Richards

F. H. RICHARDS.
DIE AND DIE MECHANISM.
APPLICATION FILED APR. 16, 1901. RENEWED AUG. 13, 1908.
919,228.
Patented Apr. 20, 1909.
6 SHEETS—SHEET 6.
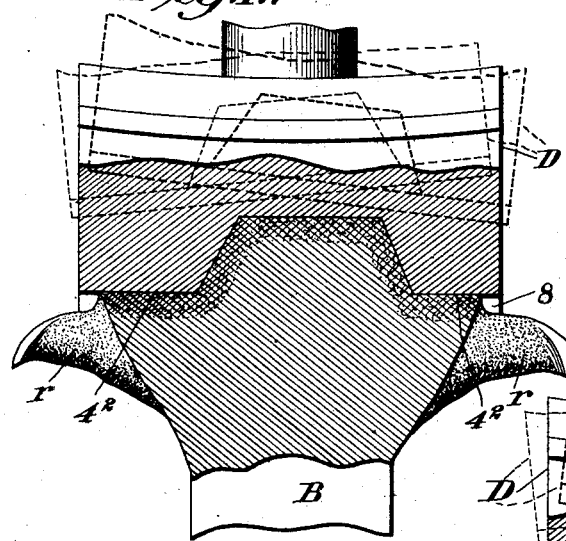
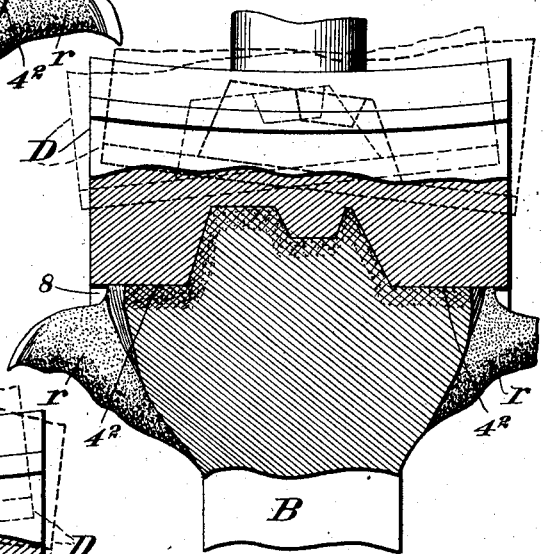
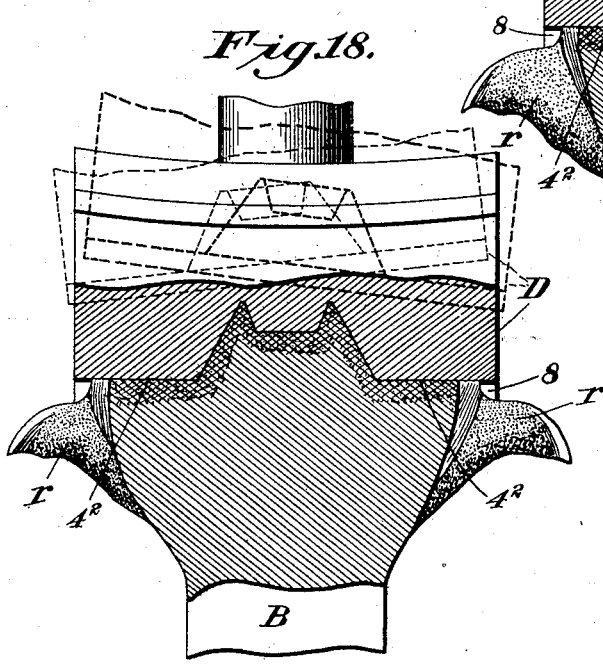
Witnesses
H. G. Dieterich
F. H. Harland
Inventor
F. H. Richards

UNITED STATES PATENT OFFICE.

FRANCIS H. RICHARDS, OF HARTFORD, CONNECTICUT, ASSIGNOR, BY MESNE ASSIGNMENTS, TO AMERICAN TYPOGRAPHIC CORPORATION, A CORPORATION OF NEW JERSEY.

DIE AND DIE MECHANISM.

No. 919,228.            Specification of Letters Patent.          Patented April 20, 1909.

Application filed April 16, 1901, Serial No. 56,166. Renewed August 13, 1908. Serial No. 448,376.

*To all whom it may concern:*

Be it known that I, FRANCIS H. RICHARDS, a citizen of the United States, residing at Hartford, in the county of Hartford and State of Connecticut, have invented certain new and useful Improvements in Dies and Die Mechanism, of which the following is a specification.

This invention relates to means for making wrought types and for making typebars embodying a series of such types, and it pertains particularly to an organization of dies and die surfaces and operative mechanism adapted to form wrought types of superior quality under various conditions obtaining in the typographic art.

Owing to the fact that many of the characters produced by types used in the typographic art are not symmetrically disposed with respect to a common axis transverse to the line of height of the characters, and determined in position, for example, by the transverse axis of symmetry of a symmetrical character, such as the "o," there is a tendency during the action of the type-forming die, in the manufacture of wrought types, and especially when the type which it is to make is located nearer one edge of the blank than the other, for the material under the die and adjacent to the former edge to flow out from under the die rapidly and in quantity, resulting in a type poorly-formed at this portion, or at least lacking in sharpness and definition. The nearer the type in process of formation is to the edge of the blank, the less is the support afforded by the stock of the blank to the material being wrought into shape by the type-forming die, and in the measure that this support is absent, the less is the resistance to flowage exerted by the metal. While a type, therefore, located in such a position on the edge of the typebar-blank that ample and substantially uniform support is provided on both sides of the type toward the sides of the blank, may be well formed; on the other hand, a type which is necessarily located nearer one edge of the blank is not in such a position as to be wrought into shape to the best advantage by the die.

In order to permit satisfactory types to be made with equal facility irrespective of the particular location of the type, whether it be symmetrical and located centrally with respect to the blank or whether it be situated more to one side of the center line of the blank than the other, I provide a die construction which compensates for or counteracts the tendency to unequal freedom in the flowage of the material under the die, whereby when operated from suitable mechanism the tendency to flowage at each side of the die is substantially equalized. These results are attained according to the present invention by the proper inclination of the end wall of the die cavity with respect to its relative distance from the median typographic line or zone maintaining throughout the series or font of dies. Each character in a font of type has its determinate relative position up or down with respect to a median line or zone universal to said font, well recognized by the compositor when looking at the distributed type and also amply apparent to the reader of the printed page. When a letter is misplaced in the printed line it may frequently enhance the symmetrical appearance of the word in which it occurs, but nevertheless it is wrong typographically. And to one familiar with the use of type forming dies or matrices this universal median line will be apparent, as will also be the relative distance of each wall or face from said line. And such relative distance determines at what angle the wall or face will be inclined since the greater the distance a wall is from the universal median line the nearer it will be to the edge of a type-bar blank when in use. And the inclination will be varied to an equal extent for diminishing the otherwise too great freedom of the material in the blank to flow out from under and empty the cavity of the die.

Figure 14:
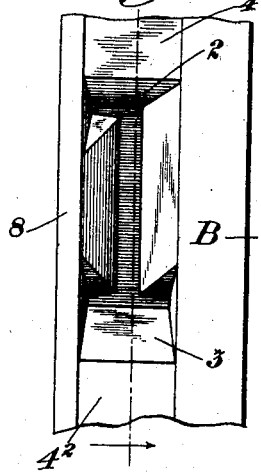
Figure 15:
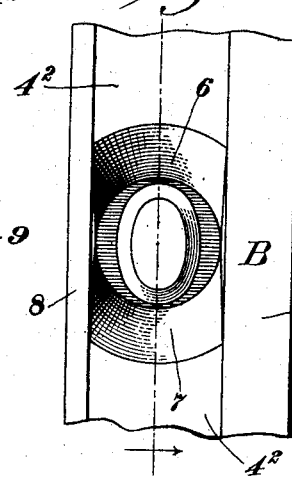
Figure 16:
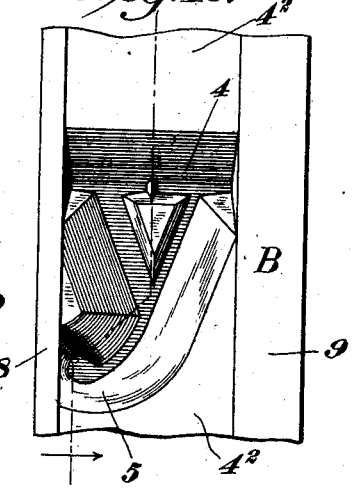
Figure 11:
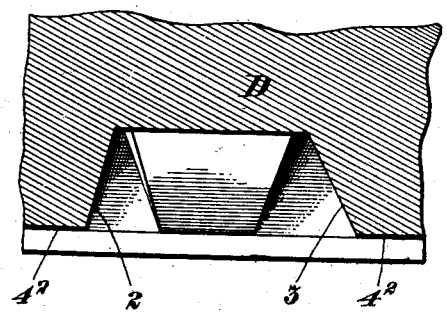
Figure 12:
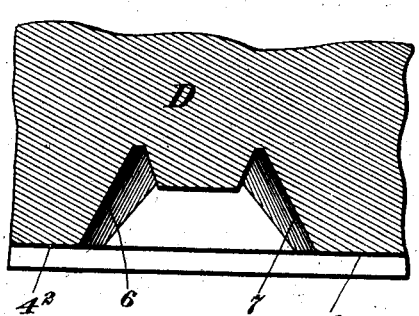
Figure 13:
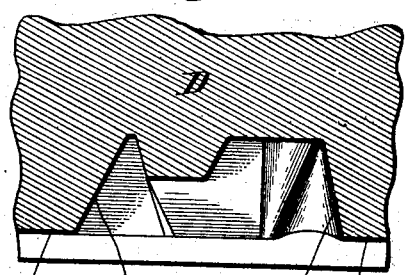

In the drawings accompanying the present specification, Figure 1 is an end elevation of an organization of mechanical elements adapted for operating a die and blank with relation to each other for carrying out my present invention. Fig. 2 is a side elevation of the mechanism, part being in section. Fig. 3 is a top view thereof. Fig. 4 is a perspective view of a blank-holder and blank-holder frame upon a somewhat enlarged scale. Fig. 5 is partly a sectional and partly a plan view of a certain feeding device embodied in the machine for effecting a longitudinal movement of the blank for the purpose of bringing consecutive portions of the edge thereof under the type-making dies. Fig. 6 is a plan view of a portion of a typebar provided with a number of types, these particular types being chosen for the purpose of illustration and being representative of those conditions obtaining in the typographic art to which the present invention is especially directed, to wit, the fact that while some types may be located centrally with respect to the width of the typebar and typebar-blank, other types are located near one edge, while still other types are located nearer the opposite edge; the scale of this figure is very much enlarged over the actual dimensions of types and typebars as such are usually made in the art. Fig. 7 is an elevational view of the types shown in Fig. 6. Figs. 8, 9, and 10 are cross-sectional views of the typebar shown in Fig. 6, the section of each figure being upon a plane extending transverse to the bar and located adjacent to each type in succession from left to right in Fig. 6 and looking in the same direction. Figs. 11, 12, and 13 are sectional views drawn to the same scale as Figs. 6, 7, 8, 9, and 10, inclusive, representing dies having faces organized according to one feature of the present invention for making the respective types set forth in Fig. 6. Figs. 14, 15, and 16 are bottom views of the dies represented in Figs. 11, 12, and 13, respectively. Figs. 17, 18, and 19 are views mostly in section representing the action of the respective dies set forth in Figs. 14, 15, and 16, each figure exhibiting the die in its working position in full lines and at a stage in the type-forming operation near the close thereof, certain other positions of the die in each figure being shown in dotted outline for the purpose, more particularly, of exhibiting a certain relative subsidiary movement imparted to the members during the making of the type.

Similar characters of reference designate corresponding parts in all figures.

In carrying out my present improvements, the type, it may be stated in a general way, results from the operation of a type-forming die, designated for reference by D, upon a blank forced one against the other to cause the penetration of the latter by the die.

The blank, designated in a general way throughout the present specification and drawings by B, may be of any material suitable for the purpose—as, for instance, type-metal of proper composition brought into the requisite or any proper shape in some suitable manner—for example, by casting, rolling, or otherwise. I have found, however, that a process for so operating upon the material as to produce a substantially wrought blank as distinguished from a condition resulting from the casting of the same to shape, or at least a blank having that portion or those portions wrought which are concerned in the formation of the several type-blocks, is best suited to the carrying out of the present improvements. Moreover, the blank upon which the types are to be formed may be a continuous ribbon or rod, or it may be in the form of a separate piece having a length substantially equal to the length of the finished typebar.

The various characters of typographic composition are differently disposed with respect to parallel boundary lines which include between them the characters of a line of composition—that is, some of the characters are centrally disposed with respect to the space between the boundary lines, while other characters extend nearer to one line than they do to the other. Assuming these boundary lines to represent the edges of a typebar-blank, it is evident, therefore, that some of the types in the corresponding typebar are located nearer one side of the bar than the other, or at least have that portion of their body adjacent to one side of the bar at a less distance from the side of the latter than the distance between the other side and the contiguous portion of the type body. The result of this non-uniform relation of any particular type body to the sides of the resultant bar gives rise to a tendency on the part of the material under the working die during the penetration of the blank by the latter to flow outward with greater facility in localities adjacent to the nearer side than in a region adjacent to the opposite side where such material is supported by a greater amount of stock. As the die enters the blank and a flowage is induced by the type-formative stresses thereof the moving material carries with it a portion of the mass within the cavity of the die, tending to empty with more or less rapidity that particular locality therein which is adjacent to the nearer side of the blank. I have found that this tendency is eliminated or nullified by making the side of the die—that is, that particular wall of the die adjacent to the side of the blank—more nearly parallel to the side of the blank with a consequent reduction in the distance across the outer portion of the die space in proportion as the die is located nearer the side face of the blank during the type-forming operation. This making of the side of the die more nearly parallel to the face of the blank has the effect of restraining metal in the die and diminishing the freedom of flowage therefrom, thus, in a measure, reducing the otherwise excessive tendency of the metal in the flowage stream below the die from dragging metal within the die downwardly and outwardly and emptying thereby the die-space of some of the metal previously forced upward into this space. I have found, further, that by making the die-walls more nearly parallel to the side of the blank, in proportion as the type or impression face extends more nearly to the extreme edge of the blank, the movement of the different parts of the metal are regulated and controlled with the effect of materially promoting the efficiency of the die action and increasing the perfection of the product with a given amount of die action on the blank. Thus, taking the "l," "o," and "y" as typical of these various positional conditions existing in the typographic art, the "l," as shown in Fig. 6 particularly, is located nearer to one extreme edge of the typebar-blank, the "y" nearer the opposite edge, and the "o" is centrally located.

The tendency of the surplus material under the respective dies during the action of each in forming the corresponding type is to flow toward the side of the typebar-blank and remove a portion from the mass within the die necessary to form and build up the complete type-block. This tendency I diminish or suppress altogether by making that wall of the die which serves to form the surface of the type-block, lying nearest the side of the blank, more nearly parallel to the vertical axis of the die, see particularly the wall 2 in Fig. 11, which figure represents a die embodying my present invention and adapted for forming the "l" as compared with the wall 3, which is adapted for forming the surface of the type-block at the opposite side of the latter, the corresponding faces of the finished type-block being designated by 2' and 3', respectively. In the organization of a die for the formation of the "y" the relatively different angles formed by the wall 4 of the die and the wall 5 with the axis of the die is shown in Fig. 13, the corresponding faces of the finished type-block being designated by 4' and 5', respectively. As regards the "o," it is evident from an examination of Fig. 6 that in this particular style of type and typebar, this type is centrally located on the edge of the bar, and hence the inclination of the walls 6 and 7 of the die (see Fig. 12) may be the same with respect to the axis of the die, the corresponding faces of the type-block being designated by 6' and 7', respectively.

In effecting the penetration of the material of the blank by the die it is immaterial whether the movement, which I may designate as a transverse feeding movement, is imparted to the blank or die or to both, but I find it convenient to feed the blank against the die. This rectilinear movement of the die and blank toward and against each other is not the only movement utilized in carrying out my present improvements for facilitating the filling of the die cavity, for removing the excess or surplus material separated or sheared from the type-block during the type-making operation and for producing a compact and dense condition of the various surfaces, but in combination with this movement there is a relative subsidiary motion imparted to the members, which combined motion operates to produce a type gradually and by a series of reductions and to accomplish a coincident working out of the excess material. This subsidiary movement operates in conjunction with the aforesaid feeding movement to force excess material away from an adjacent type during the making of a typebar—that is, crosswise or laterally of the blank—and for further protecting this already-formed type I preferably use a wall or plate adapted to enter into the comparatively narrow space between the finished type and the material under the working die where it is located during the type-forming operation, serving as a retaining surface against which the moving material or flowage is received and by which it is directed. Such wall, it is evident, so far as the purposes it fulfils are concerned, may be separate from the die and operated independently thereof, but I find it convenient to attach it to the die and operate the two as a unit. The foregoing subsidiary movement operating to gradually form a type and work excess material outward transversely or crosswise of the blank preferably reverses in direction alternately for the reason that such alternating motion is conveniently attained and is best adapted to produce a uniform type. In other words, a relative oscillatory movement is imparted to the members (the blank and the die) during the period of type-forming, and for the production of this relative motion I find it convenient, in the organization of mechanical elements chosen for the purpose of illustrating an embodiment of combinational means for coöperating with the present die construction, to oscillate the die by imparting such motion to a suitable die-carrier.

The wall previously mentioned and which may be provided for the purpose of protecting an adjacent type, also insures the ordinary type-separating space, and is located at the rear side of the type-forming die and is designated herein by 8. At the opposite side of each die there is shown a space-forming die or plate 9 whose width is considerably greater than the corresponding dimension of the retaining wall 8, and which serves during the operation of the die on the blank to form a space in advance of the type considerably wider than this space will eventually be when the next type is formed. The purpose of this temporarily enlarged space is to make for the type-block next to be made a surface or path of least resistance along which the type-formative stresses of the type-forming die may induce a flowage in preference to creating detrimental deforming strains. Such a method of type-forming is illustrated and thus briefly described in conjunction with the present invention as one manner of carrying the latter into practice, although the particular method involving the making of such surface of least resistance in itself forms no particular feature of the present improvements, the same being more fully described in a pending application, Serial No. 57,934, filed April 29, 1901, to which reference may be made for more detailed information.

Referring now to various mechanical elements which are adapted to effect a proper operation of the die as the same is organized according to the present invention, it will be understood that the particular organization and the illustrated and described elements are representative only, as various other mechanisms operated and operating in other ways are equally well adapted for carrying out the present invention. The particular organization it will be understood, therefore, is chosen for the purpose of representing a suitable embodiment of mechanical parts which are adapted to secure an appropriate action of the dies as herein organized and constructed. Referring now to this illustrated embodiment, a suitable supporting framework for supporting the various operative parts and minor frame elements is shown and designated in a general way by C, comprising a suitable bed-plate $c$ supported upon legs $c'$. The several dies D for producing the various types used in composition may be adjusted and brought into proper relation to the blank B by hand or by mechanism or by any other means operated or operating to attain the desired sequence. The dies, as an instance of a device for their convenient manipulation, may be mounted upon the periphery of a die-carrier, shown in the form of a wheel or disk and designated generally herein by X, whose shaft $x$ is mounted in a swing-frame 10, journaled in an upright 11, extending from the bed-plate $c$,—a construction which will permit the die-carrier, and hence a die thereon, to be oscillated to and fro while the latter is in contact with the edge of the type-bar-blank. For supporting this blank during the action of the die there is provided a suitable holder, designated in a general way herein by H, having a blank-supporting slot $h$, and to enable a blank therein to be pressed upward against a die on the carrier the holder may be fulcrumed, as shown, by means of arms 12, 12 to uprights 13, 13, of the bed-plate $c$. The actuator for feeding the holder and its blank upward toward the die-carrier consists in this case of cams 14, 14 secured to a shaft 15, journaled in suitable bearings extending from the bed-plate, against which cams bear cam-rollers 14', 14', respectively, secured to a shaft 14'', mounted upon the blank-holder, a spring 14''' being provided for maintaining the contact of the cams with the cam-rollers. In the actual practice of the improvements the elevation of the blank-holder to press the blank therein successively against the dies will result ordinarily automatically, but in this instance I have shown as a means for obtaining a rotary movement of the cam-shaft 15 a worm-wheel device consisting of a worm wheel 16 attached to the cam-shaft and meshing with a worm 16', secured to a driving-shaft 16'', journaled in suitable bearings and provided with a means for actuating it, this means being here shown as a crank-handle 17. The cams 14, 14 are of proper construction and form to secure a range of movement necessary to press a die and the blank together to a sufficient extent to form a type, and each cam may be provided with a recessed portion 14$^a$ which when the corresponding cam-roller lies therein will insure a depression of the blank-holder adequate to cause the contained blank or type-bar to clear the dies on the die-carrier.

It is evident from what has already been stated that the die-carrier is rotarily adjustable to bring the desired die to its working point, and to enable this adjustment in the present organization of parts to be attained with facility the shaft of the die-carrier is provided with an adjusting wheel 18 and an index 18' provided with characters designated in a general way by 18'', corresponding to the dies upon the carrier and in such positions that in coöperation with a pointer 19 any desired die on the carrier may be brought into proper relation with the edge of the blank.

It has already been stated that during the type-making operation, in which the die advances into the blank, an oscillatory motion is imparted to the die, to and fro, extending, it should be said, through a comparatively small angle. For the attainment of this oscillatory motion and as the present mechanism is organized, the shaft of the die-carrier is provided with a gear-wheel 20, which engages during the type-making operation with a rack 21, causing as a result of this construction, when the swing frame supporting the die-carrier is oscillated, a to and fro rolling movement of the die in contact with the blank. This rack is here adapted to swing back out of engagement with the gear-wheel 20, when it is necessary to manually rotate the die-wheel and adjust a die into position, by providing a pivotal shaft 21' at the lower end of the rack frame 21'' about which the latter may swing, the frame also being provided with an arm 22 for swinging the same from its engaging position. A spring 23 normally presses the rack into a position in which its teeth engage with the gear-wheel. This normal position is determined by a stop 23' extending from the rack frame in the form of an arm and contacting with a suitable projection 23'' provided on the bed-plate.

Some appropriate device for oscillating the die is utilized, that herein shown being an instance thereof and consisting of an eccentric 24 secured to the driving-shaft 16'' and operating through a link 25 connected at its upper end to an arm 26 extending from the die-carrier frame.

I have also shown a means for feeding the blank longitudinally to bring successive portions to the type-making point, which consists of a screw 27 whose thread engages with suitable notches formed in the side face of the blank. When rotated by means of a finger-wheel 28 attached to the shaft 29 of the screw the latter causes the blank to be fed forward lengthwise of its supporting slot. The direction, rapidity, and extent of these type-forming movements—that is, the transverse feeding movement and the oscillatory movement—and the relation of these various factors to each other, as well as the relation of the two specified movements one to the other, may be varied in any desired manner. The duration of the oscillatory movement may be embraced, for instance, within the limits of the period in which the members are fed toward and against each other, but preferably the oscillation will commence after the type has been partially formed and cease just before the feeding movement terminates. Furthermore, both movements may be uniform throughout their whole duration or either may be varied or they may both be varied. With respect to an appropriate interrelation, I have found good results to follow from a gradual reduction in the speed of the transverse feeding movement during the later portion of such movement accompanied by a concurrent oscillatory motion decreasing in amplitude or extent of oscillation during the later stages of the feeding movement, ceasing altogether just prior to the termination of the latter.

The action to which the material under the die, considered in its entirety, is subjected as a result of the oscillatory movement herein described when the blank is under the compression of the die may be described as a rolling action. As the die advances into the material of the blank and the die is oscillated from side to side, more and more of the material is forced into the die cavity and subjected to the forging and swaging action of the walls and faces of such cavity. More and more of the material necessary to build up and form the type-block as the edges at the outer portion of the die alternately bite afresh into the blank is forced or squeezed upward into the die, and under the impact and pressure of the interior faces of the die as the relative inclination of these faces to the surfaces of the mass changes, by reason of the oscillatory movement the material is forged and wrought to form, while the faces at the bottom of the die cavity serve to swage the upper portion of the type-block to shape.

When the type-block is not located centrally, transversely of the edge of the blank, that wall of the die situated nearest to the extreme edges of the blank being more nearly parallel to the side face of the blank— that is, extending more in the direction of die movement—as compared with the opposite wall, opposes thus a less resistance on that side to the penetration of the blank, the effect of which is to more or less effectually confine the force urging the material downward to the outside of the die and to lessen the pressure or thrust on the mass within. The stresses therefore tending to induce flowage are greatest at the outside of the die and the tendency to flowage and the forces giving rise thereto in the mass within the die cavity is reduced in proportion as the wall of the cavity is made more nearly to coincide with the direction in which the die moves. Thus, within limits, there exists, according to my present invention, an organization of die-walls or surfaces and actuating mechanism which permits the die to be operated with substantially uniform results at any portion of the edge of the blank with references to the position of the die transverse of the blank edge. That is to say, by adapting the relation of the side wall of the die to the particular position transverse of the blank assumed by the die when working, the facility with which the material flows downward under the action of the advancing and oscillating die is substantially equalized for the two sides of the die whether the edges of the blank be located at the same distance from those walls or whether they are located at unequal distances therefrom.

The action to which the material is subjected is one effecting a gradual reduction thereof, operating to compact the material of the type-block and render the surfaces smooth and unbroken and to connect them one with the other in a manner precisely conforming with the boundary edges or lines of intersection between the planes of the corresponding faces of the die. Moreover, the forging operation results in the strengthening of the integral connection of the block with the stock of the blank. During the oscillatory movement, also, first on one side and then on the other, an outlet is created by reason of the slight separation of the material from the faces of the die through which air confined in the latter may escape and oil, grease and other foreign matter be squeezed outward, assisting thus in the production of an exact counterpart of the type-forming die.

I find it convenient to remove those portions of the edge of the blank lying at the sides of the forming type-block concurrently with the formation of the type-block, and I utilize for this purpose the described oscillatory motion to gradually work such material outward laterally of the blank. The crosswise movement of this material is effectively accomplished by presenting to the material at such points where movement or flow is required, a relatively fixed surface or surfaces, which, as a result of the oscillatory and transverse feeding motions, works the material under it outwardly by pressing on the same. Such surfaces, it is manifest, may be independent of the die, but for the sake of convenience they may be connected therewith and may, in fact, form surfaces of integral extensions of the die body. They are here so represented, (see particularly 4² and 4²,) the lower edge of the retaining wall 8, already mentioned as serving to confine the material endwise of the blank, being also utilized for displacing to some extent the material between the finished type at the rear and the type-block under process of formation, while the space-forming die 9 at the other side of the die operates in a similar manner to form a space in the edge of the blank.

Figs. 17, 18, and 19 represent in a diagrammatic way the relative positions assumed at times by the die and blank. As the blank and the die are pressed against each other and the material of the blank is compressed by the die and the latter rocks or rolls to and fro from one position to another, as represented in dotted outline in a general way in these figures, the material is forged and wrought to shape and the excess is rolled laterally of the blank by the described working surfaces spreading out into a shape somewhat as represented by the pins $r$ in the figures. The material forced beyond the planes of the sides of the typebar-blank by the operation of the dies may be trimmed off and removed to bring the sides of the bar into substantial parallelism by some suitable means.

The spaces between the types of words and letters, whether such spaces be of uniform width or otherwise, may be produced in any appropriate manner, but preferably they will be formed by a suitable die or dies operating to remove portions of the edge of the blank sidewise of the latter and form spaces by a rolling action, as already described.

Having described my invention, I claim—

1. A die having the shape of the walls of its cavity varying with reference to the positions such walls will occupy relative to the universal medial typographic zone.

2. The combination with a series of selective dies, each having a cavity the shape of the walls of which vary with reference to the positions such walls occupy relative to the universal medial typographic zone.

3. The combination with a series of selective dies, each having a cavity the shape of the walls of which vary with reference to the positions such walls occupy relative to the universal medial typographic zone, and means for bringing a selective die of the series and a blank into working relation.

4. A series of dies, the shape of the walls of the die cavities varying with reference to the positions of such walls relative to the universal normal typographic zone.

5. A series of selective dies each having the surfaces of its cavity differentially inclined dependent upon the relative position of such die to the universal median line of the series.

6. The combination with a plurality of selective dies each having the wall or face which is farthest from the universal median line at a less angle to the perpendicular than the inclination of a wall which is nearer such line.

7. A series of type forming dies having those walls or faces which are located farthest from a universal median line of less inclination than those walls or faces which are located nearer to such line.

8. The combination with a series of type forming dies, the inclination of the end walls or faces of the cavities of the dies being dependent upon the nearness of that wall or face to a median line universal throughout the series of dies, of means for feeding a selected die and a type-bar blank one against the other.

9. The combination with a series of type forming dies, the inclination of the end walls or faces of the cavities of the dies being dependent upon the nearness of that wall or face to a median line universal throughout the series of dies, of means for feeding a selected die and a type-bar blank one against the other and for imparting a relative subsidiary movement to these during the feeding movement.

10. The combination with a series of type forming dies, the inclination of the end walls or faces of the cavities of the dies being dependent upon the nearness of that wall or face to a median line universal throughout the series of dies, of means for feeding a selected die and a type-bar blank one against the other and for imparting a relative oscillatory movement to these during the feeding movement.

11. The combination with a series of type forming dies, the inclination of the end walls or faces of the cavities of the dies being dependent upon the nearness of that wall or face to a median line universal throughout the series of dies, of means for feeding a selected die and a type-bar blank one against the other and for imparting a relative oscillatory movement to these during the feeding movement, such oscillatory movement being universal for all the dies.

12. The combination with a plurality of selective dies, each having the wall or face which is farthest from the universal median line at a less angle to the perpendicular than the inclination of a wall which is nearer such line, means for selectively bringing the dies into a common working position with the said universal median line of each of the several dies when so brought to position at the same place, a typebar blank holder and actuating means associated therewith constructed and adapted for presenting a typebar blank to the dies at the working position with the universal median type line of the blank coinciding with the universal median line of the die at the working position.

13. The combination with a plurality of selective dies, each having the wall or face which is farthest from the universal median line at a less angle to the perpendicular than the inclination of a wall which is nearer such line, means for selectively bringing the dies into a common working position with the said universal median line of each of the several dies when so brought to position at the same place, and means for presenting a typebar blank to the die at the working position with the universal median type line of the blank coinciding with the universal median line of the die at the working position.

FRANCIS H. RICHARDS.

Witnesses:
FRED. J. DOLE,
C. E. VOSS.